United States Patent Office

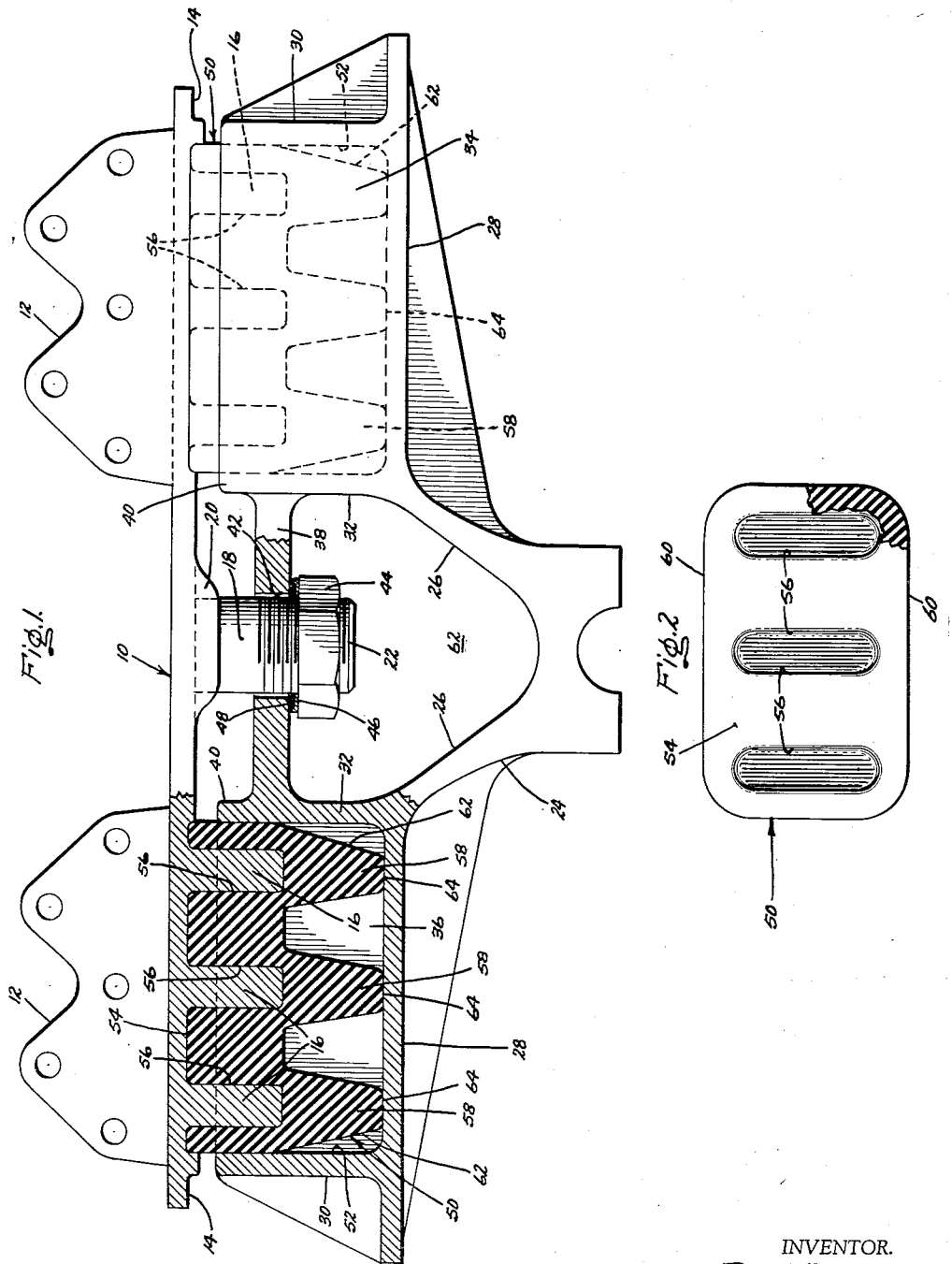

3,011,776
Patented Dec. 5, 1961

3,011,776
VEHICLE SUSPENSION
Paul J. Reed, 19 E. Main St., Wabash, Ind.
Filed May 13, 1960, Ser. No. 29,101
6 Claims. (Cl. 267—63)

The present invention relates to a vehicle suspension, and more particularly to a suspension utilizing rubber-like blocks which serve the twofold purpose of providing a spring mounting as well as a driving connection between the vehicle frame and axle support.

In the past, it has been customary to use steel springs between the vehicle chassis and axle supports for providing a resilient suspension, but in recent years it has been found that cushions made of rubber-like material may be substituted for the steel springs. A resilient suspension using rubber-like cushions is disclosed in Patent No. 2,689,136, and another in my application Serial No. 845,978, filed October 12, 1959, now abandoned, entitled "Resilient Suspension for Vehicles." In both of these suspensions, the rubber cushions serve the sole function of resiliently supporting the vehicle load, a different portion of the suspension providing the driving connection between the axle support and the vehicle chassis. Thus, these prior art constructions included two essential structural portions, one portion providing resilient support and the other the driving connection.

In the present invention, these two portions are integrated into a single structure or subassembly, this combining of the two functions into a single subassembly serving to simplify the overall design, reduce cost of manufacture, and substantially to minimize structural failures and required maintenance.

It is therefore an object of this invention to provide a new and improved resilient suspension for vehicles wherein the resilient cushion and driving connection are provided by the same structural assembly.

It is another object of this invention to provide an improved and simplified resilient suspension for vehicles wherein rubber-like members absorb both vertical loads and driving forces transmitted between the vehicle chassis and axle supports.

It is yet another object of this invention to provide a vehicle suspension which, when compared with prior art designs, is simpler, less costly, and requires only a minimum of maintenance for prolonged periods of operation.

Other objects will become apparent as the description proceeds.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a side elevation, shown partly in section, of one embodiment of this invention; and FIG. 2 is a top plan view of the rubber-like block used in the embodiment of FIG. 1.

Referring to the drawings, and more particularly to FIG. 1, the invention as illustrated may be used on trucks, tractors, semi-trailers, mobile homes and the like, and when used on trucks, two tandem rear wheels may be connected to the assembly as illustrated in my prior application Ser. No. 845,978, filed October 12, 1959. In almost all instances, wheels used in connection with the illustrated assembly will be equipped with brakes, the braking load being transmitted to the vehicle through the mechanism to be described in the following.

In FIG. 1, a frame, generally indicated by the reference numeral 10, is adapted to be fixedly secured to the vehicle chassis, this frame comprising a generally flat and elongated steel or the like plate having spaced apart, upstanding brackets 12 adapted to be bolted or otherwise secured to the chassis. Depending from the flat underside 14 of the frame 10 are a plurality of spaced-apart lugs 16, there being two sets of three lugs each on the opposite end portions, respectively, of the frame. Since these sets are identical in the illustrated embodiment, a description of one set will suffice for both. The lugs are preferably identical in shape, being substantially rectangular in cross-section as illustrated in FIG. 1, the lug sides being substantially vertical. The lugs are elongated transversely of the frame 10, preferably being arranged at right angles to the longitudinal dimension of the frame. The lugs have a height which will be described in more detail hereinafter. All corners of the lugs are liberally radiused for a reason which will become apparent from the following description.

Midway between the ends of the frame 10 and depending therefrom is a rebound stud 18. This stud is secured to the frame 10 preferably by means of a weld 20, but it will appear obvious to persons skilled in the art that other means of securing may be used without departing from the spirit and scope of this invention. The lower end 22 of the stud is threaded as shown.

Disposed immediately beneath the frame 10 is a saddle 24 which may be similar in size and construction to saddles used in prior art suspension systems in the respect that it is relatively large and strong and is fabricated of cast steel or alloy material such as aluminum or magnesium. The saddle is provided with two angularly outwardly extending arms 26 arranged in a substantial V-shape, the lower portions of the arms being integrally connected together as shown. Two outwardly and oppositely extending platforms 28 are connected to the upper ends, respectively, of the arms 26, these platforms being flat and horizontally disposed. In the illustrated embodiment, these platforms are generally rectangular and coplanar with the length dimensions thereof extending in the same direction as an imaginary straight line connecting the tops of the arms 26.

Each of the platforms 28 is provided with an upstanding perimetral wall providing end walls 30 and 32 and side walls 34 and 36. These walls in combination with the respective platform 28 provide sockets 52, the respective platforms 28 serving as the socket bottoms.

In the central portion of the casting and formed integrally therewith is a relatively thick and strong bridge element 38, this element resembling a flat plate horizontally disposed which extends from one socket end wall 32 to the other socket end wall 32 as shown. In the saddle construction, since all of the various parts thus far described are a part of the same integral casting, it will be appreciated that the socket end walls 32 actually constitute an upright extension of the saddle arms 26. The bridge element 38 is connected to these end walls 32 adjacent to the upper ends 40 thereof. From the following description, another reason will appear as to why the bridge element 38 is thus situated.

An opening 42 is provided in the central portion of the bridge element 38 for receiving, with clearance, the stud 18 which depends from the frame 10. A nut 44 threaded on the lower end 22 of the stud 18 operatively bears against the underside of the bridge element 38 through a steel retaining washer 46 and a rubber cushion washer 48, the nut 44 being tightened on the stud 18 with just enough force to provide engagement of the washer 48 with the bridge element 38. As will appear in the following, this stud-nut combination 18, 44 serves only as a rebound attachment whereby the frame 10 and saddle 24 are retained in assembly during use. Also, as will become apparent to a person skilled in the art, this rebound attachment may be positioned elsewhere in the assembly without departing from the spirit and scope of this invention.

Interposed between the frame 10 and the saddle 24 are two blocks 50 of resilient material, this material preferably being rubber. As shown in both FIGS. 1 and 2, the block 50 is generally of rectangular configuration and is of substantially the same size and shape as the respective socket 52 into which it is inserted. The upper surface 54 of the block is flat or is otherwise shaped so as to engage intimately the underside 14 of the frame 10 as shown. As is shown in FIG. 1, the block extends upwardly out of the socket 52 a predetermined distance so as to space the frame 10 above the saddle.

The upper portion of the block 50 is provided with three elongated, substantially rectangular recesses 56, these recesses being of such size and depth to embrace or otherwise engage snugly the peripheral surfaces of the respective three lugs 16. As shown more clearly in FIG. 2, the ends of the recesses 56 terminate short of the sides and ends of the block, thereby determining the length of the various lugs 16. The height of the lugs 16 and recesses 56 is approximately one-half the height of the block 50.

The lower portion of the block 50 comprises three depending ribs 58 which extend between the block sides 60 substantially at right angles to the longitudinal dimension of the block. Also, preferably these ribs 58 are disposed in registry immediately beneath the respective recesses 56 and in parallelism therewith. These ribs 58 as shown are spaced equal distances apart and are tapered downwardly and away from each other. The endmost ribs 58 have the end surfaces 62 thereof tapered downwardly away from the adjacent end walls 30 and 32 for a purpose which will become apparent from the following. The lower extremities of the ribs terminate in flat surfaces 64 which are coplanar and intimately engageable with the upper surface of the respective platform 28.

It should be noted that the lugs 16 depend into the respective socket 52 a distance which vertically overlaps the connection of the bridge 38 with the end walls 32. Thus, by drawing a straight line through and parallel with the bridge 38, this line will intersect the lower end portions of the lugs. By means of this dimensional arrangement, substantially the entire upper half or portion of the block 50 is interposed between the end walls 30 and 32 of the socket and the three lugs 16, this upper portion also being between the three lugs 16 and the straight line projection of the bridge element 38. Thus, force may be transmitted directly from the saddle 24, the end walls 32 and the bridge 38 to the lugs 16 of the frame 10 through the upper portion of the rubber block.

As viewed in FIG. 1, it will be noted that about the upper half of the block 50 with the lugs 16 inserted into the companion recesses 56 is of solid cross-section such that this portion of the block is substantially solid and incompressible. However, the lower half of the block is composed of the three ribs 58, these ribs being tapered in cross-section for the purpose of facilitating resilient deformation thereof when the block is subjected to a vertical load. Also, it should be noted that the upper portion of the block which is substantially solid and incompressible is subjected directly to the driving forces exerted between the frame 10 and the saddle 24. Thus, the block 50 not only supports the load of the vehicle on the saddle 24, but also serves as a transmissive medium of the driving forces exerted between the frame and saddle.

In operation, the two blocks 50 absorb the vertical shock in relative movement between the vehicle chassis and the wheels and axles, these blocks serving as resilient cushions for softening the ride of the vehicle. Under shock or load, the ribs 58 of the blocks are pressed downwardly against the bottoms of the respective sockets 52 compressing and deforming the same. Because of the natural resiliency of the ribs, they of course react against such deformation, resiliently, to restore the vehicle to its normal position with reference to the saddle. Since under this deformation of the ribs the saddle 24 will move vertically with respect to the frame 10, it is obvious that the socket walls 30, 32, 34 and 36 will move vertically with respect to the blocks 50. There may be some attrition between these walls and the block, but this attrition is so slight and negligible that little or no wear on any of the engaging surfaces will occur. In actual practice, the rubber block is preformed to have a clearance of approximately 0.010 of an inch with the side walls of the respective socket, and under these conditions there is very little attrition. Since the upper portion of the block is substantially solid, and since the lower portion deforms and depresses under load, this upper portion will not distend appreciably under load to cause the latter to have more than negligible sliding engagement with the socket walls.

Not only do the blocks 50 serve as supporting springs or cushions, but they also serve as the intermediary for transmitting driving forces from the saddle 24 to the frame 10. The portion of the rubber blocks between the walls 32 and the lugs 16 being confined between the frame 10 and the bottom or platform 28 serves as the substantially solid and incompressible connection therebetween. However, the rubber inherently has some resilience which cushions the transmission of this driving force.

Thus it is apparent that the rubber blocks serve a twofold purpose of cushioning road shock as well as transmitting forces between the vehicle frame and the wheels and axles.

In an operating embodiment of this invention, the following dimensions were used, these dimensions being given for the purpose of enabling a person skilled in the art to build an operating embodiment of the invention; however, the present invention is not to be limited thereto, since other dimensions may be used without departing from the spirit and scope of this invention:

| | |
|---|---|
| Thickness of the rubber block between wall 32 and adjacent surface of the lug 16_____inches___ | 1 |
| Width of recess 56 (same as width of lug 16) _____inches___ | 1¼ |
| Distance between recesses 56 (same as distance between lugs 16)_____inches___ | 2¾ |
| Length of block 50 (substantially the same as distance between end walls 30 and 32)___inches___ | 11¼ |
| Height of block 50_____do____ | 7 |
| Height of ribs 58_____do____ | 3⅜ |
| Distance between ribs 58 at narrowest point_do____ | 1⅜ |
| Width of end surface 64 of center rib 58___do____ | 1 |
| Width of end surface 64 of endmost ribs 58_do____ | 1¼ |
| Taper of surfaces of endmost ribs 58 with the vertical _____degrees___ | 15 |
| Taper of surfaces on center rib 58 with the vertical degrees__ | 9 |
| Height of socket 52_____inches___ | 5½ |

It should be recognized that all of the corners on the block 50 are liberally curved or rounded. If the corners were sharp, the rubber would cut, tear, shear or otherwise fail, whereas by rounding the corners, the distribution of forces are such that the rubber is not damaged.

It will now become apparent that the suspension just described is quite simple in design and contains no metallic parts which rub against each other. No lubrication is required, thereby eliminating entirely or requiring only a negligible amount of maintenance over prolonged periods of usage, such as two to three years. As a matter of fact, the only maintenance required after a relatively long period of usage is the replacement of the rubber blocks which obviously is a simple operation.

When it is necessary to change the rubber blocks it is only necessary to remove the nut 44 from the rebound stud 18, access to this nut being gained through the opening 62 in the saddle.

The rubber blocks 50 are preferably molded. They are not prestressed or precompressed before insertion into the assemblage as is true of certain other rubber cushion elements as used in prior art mechanisms. This renders the manufacture and use of the rubber blocks the ultimate in simplicity and economy.

For each axle on a vehicle, two of the structures as illustrated in FIG. 1 are used. This provides a four-point suspension between the chassis and axle with a stable load cushion 50 at each point. This four-point suspension is significant for the reason that when weighing the axles for overloading, the weight in the vehicle will not shift as is true in single point suspensions. The rubber block 50 does not deflect as much as a metallic spring in absorbing shock or vehicle weight thereby rendering it very stable. For example, with an 18,000 pound maximum legal load limit for each axle, a two-axle vehicle should be able to carry 36,000 pounds within legal limits. With a very flexible suspension, or a single point suspension on each side of the vehicle, even though the load on the vehicle is within legal limits, if each axle is weighed separately, as is the custom in some areas, the load has a tendency to shift through the suspension such that one axle may show 18,000 pounds but the second axle may show 20,000 or 21,000 pounds. This weight shifting is a common fault with both flexible and single-point suspensions.

Through the use of the present invention, a 4-point suspension is provided through which no weight shifting occurs whereby the weighing of each axle separately provides a correct indication of the weight of the vehicle.

Other advantages will readily occur to a person skilled in the art.

While I have described above the principles of my invention in connection with specific apparatus, it is to be clearly understood that this description is made only by way of example and not as a limitation to the scope of my invention.

What is claimed is:

1. A vehicle suspension comprising a frame and saddle; said saddle comprising an integral casting having two angularly upwardly extending arms forming a V-shape, two outwardly and oppositely extending platforms connected to the upper ends, respectively, of said arms, said platforms being substantially flat and horizontally disposed, said platforms being generally rectangular with the length dimensions thereof extending in the same direction as an imaginary straight line connecting the tops of said arms, each platform having an upstanding perimetral wall thereby forming a socket having said platform as the bottom, a horizontally extending bridge element connected at its opposite ends to the facing wall portion of said sockets respectively; said frame being spaced immediately above said saddle and including a flat plate disposed above and across said sockets, said flat plate having a plurality of driving lugs thereon depending into said sockets, respectively, a distance which positions said lugs in line with said bridge element, there being at least three lugs for each socket, said lugs being elongated and spaced apart laterally, the length dimensions of said lugs extending parallel to the width dimensions of the respective sockets, the lower extremities of said lugs being spaced above the respective bottoms, the endmost lugs for each socket being spaced inwardly from the respective adjacent socket walls, the opposite ends of said lugs being spaced inwardly from the respective adjacent socket walls; a pair of rubber blocks in said sockets, respectively, supporting said frame in position above said saddle, each block comprising upper and lower sections, the upper section substantially filling the upper portion of the respective socket and having recesses which snugly receive the respective lugs, said upper section extending upwardly a predetermined distance out of the respective socket to engage the underside of said flat plate thereby spacing said frame a predetermined distance above said saddle, the outer periphery of said upper section conforming in size and shape to the inner periphery of the respective socket, the lower section of each said block comprising three elongated ribs laterally spaced apart, said ribs being disposed immediately below respective ones of said lugs and extending parallel thereto, the lower extremities of said ribs engaging the respective socket bottom, said ribs in cross-section being tapered downwardly; said bridge element having an opening therethrough, and a rebound stud secured at one end to the underside of said flat plate passing with clearance through said opening to receive on the other end a nut for holding said saddle and frame in assembly.

2. A vehicle suspension comprising a frame and saddle; said saddle comprising an integral casting having two angularly upwardly extending arms forming a V-shape, two outwardly and oppositely extending platforms connected to the upper ends, respectively, of said arms, said platforms being substantially flat and horizontally disposed, said platforms being generally rectangular with the length dimensions thereof extending in the same direction as an imaginary straight line connecting the tops of said arms, each platform having an upstanding perimetral wall thereby forming a socket having said platform as the bottom, a horizontally extending bridge element connected at its opposite ends to the facing wall portions of said sockets respectively; said frame being spaced immediately above said saddle and including a flat plate disposed above and across said sockets, said flat plate having a plurality of driving lugs thereon depending into said sockets, respectively, a distance which positions said lugs in line with said bridge element, said lugs being elongated and spaced apart laterally, the length dimensions of said lugs extending parallel to the width dimensions of the respective sockets, the lower extremities of said lugs being spaced above the respective bottoms, the endmost lugs for each socket being spaced inwardly from the respective adjacent socket walls, the opposite ends of said lugs being spaced inwardly from the respective adjacent socket walls; a pair of rubber blocks in said sockets, respectively, supporting said frame in position above said saddle, each block comprising upper and lower sections, the upper section substantially filling the upper portion of the respective socket and having recesses which snugly receive the respective lugs, said upper section extending upwardly a predetermined distance out of the respective socket to engage the underside of said flat plate thereby spacing said frame a predetermined distance above said saddle, the outer periphery of said upper section conforming in size and shape to the inner periphery of the respective socket, the lower section of each said block comprising a plurality of elongated ribs laterally spaced apart, said ribs being disposed immediately below respective ones of said lugs and extending parallel thereto, the lower extremities of said ribs engaging the respective socket bottom, and rebound means connecting said saddle to said frame.

3. A vehicle suspension comprising an elongated frame having an underside, at least two spaced apart lugs on said frame depending from said underside, a saddle having two spaced apart upwardly opening sockets, said sockets being disposed beneath the underside of said frame and receiving therein respectively said lugs, said sockets each having a bottom and upstanding peripheral walls, two rubber blocks received by said two sockets respectively, each block engaging the bottom and being embraced by the walls of the respective socket, each said block being preformed to substantially the same shape and size as the respective socket walls, said blocks extending upwardly a predetermined distance from the respective socket to be engaged by the underside of said frame, said blocks embracing the respective depending lugs, the lower extremities of said lugs being spaced upwardly from the respective socket bottoms, the lower portion of each block being constituted of a plurality of depending ribs which engage along the lower extremities the respective socket bottom, said ribs being spaced apart and tapered downwardly away from each other, a bridge element on said saddle connected at its opposite ends to the facing walls of said sockets, the connection of said bridge element to said walls being at a point in line with the overlapping portions of the respective lugs and walls, and rebound means connecting said saddle and frame together.

4. A vehicle suspension comprising an elongated frame having an underside, at least two spaced apart lugs on said frame depending from said underside, a saddle having two spaced apart upwardly opening sockets, said sockets being disposed beneath the underside of said frame and receiving therein respectively said lugs, said sockets each having a bottom and upstanding peripheral walls, two rubber blocks received by said two sockets respectively, each block engaging the bottom and being embraced by the walls of the respective socket, each said block being preformed to substantially the same shape and size as the respective socket walls, said blocks extending upwardly a predetermined distance from the respective socket to be engaged by the underside of said frame, said blocks embracing the respective depending lugs, the lower extremities of said lugs being spaced upwardly from the respective socket bottoms, the lower portion of each block being constituted of a plurality of depending ribs which engage along the lower extremities the respective socket bottom, said ribs being spaced apart and tapered downwardly away from each other, said saddle including means rigidly interconnecting said sockets whereby driving force may be transmitted to said frame through said rubber blocks.

5. A vehicle suspension comprising an elongated frame having an underside, at least two spaced apart lugs on said frame depending from said underside, a saddle having two spaced apart upwardly opening sockets, said sockets being disposed beneath the underside of said frame and receiving therein respectively said lugs, said sockets each having a bottom and upstanding peripheral walls, two rubber blocks received by said two sockets respectively and interposed between the socket bottoms and said frame to support said frame on said saddle, said blocks extending a predetermined distance out of said sockets, said blocks engaging the respective lugs in the space inside the respective sockets between the lugs and the respective socket walls, the lower extremities of said lugs being spaced upwardly from the respective socket bottoms, the lower portion of each block comprising a plurality of depending ribs which engage along the lower extremities the respective socket bottom, said ribs being spaced apart and tapered downwardly away from each other, said saddle including means rigidly interconnecting said sockets whereby driving force may be transmitted to said frame through said rubber blocks.

6. A cushion member comprising a block of resilient material, said block having a substantially flat upper surface and spaced apart upright sides and end walls, the upper portion of said block having three spaced apart elongated recesses which open through said upper surface and which extend transversely of said block between said sides, the ends of said recesses being spaced inwardly from said sides, said recesses having substantially upright surfaces, the lower portion of said block comprising three spaced apart elongated ribs which extend transversely of said block, the lower extremities of said ribs having substantially flat surfaces which lie in a common plane substantially parallel to said upper surface, said ribs being disposed below said recesses, said ribs further being of substantially the same height and in cross-section tapering downwardly to the flat surfaces respectively, the center rib having opposite sides which taper downwardly at an angle of nine degrees with the vertical, and the endmost ribs each having opposite sides which taper downwardly at an angle of fifteen degrees with the vertical.

References Cited in the file of this patent
UNITED STATES PATENTS

| | | |
|---|---|---|
| 1,691,723 | Keys | Nov. 13, 1928 |
| 1,901,945 | Avery | Mar. 21, 1933 |
| 2,322,193 | Kaemmerling | June 15, 1943 |
| 2,689,136 | Hendrickson | Sept. 14, 1954 |
| 2,898,063 | Doughty | Aug. 4, 1959 |

FOREIGN PATENTS

| | | |
|---|---|---|
| 619,168 | Great Britain | Mar. 4, 1949 |